UNITED STATES PATENT OFFICE.

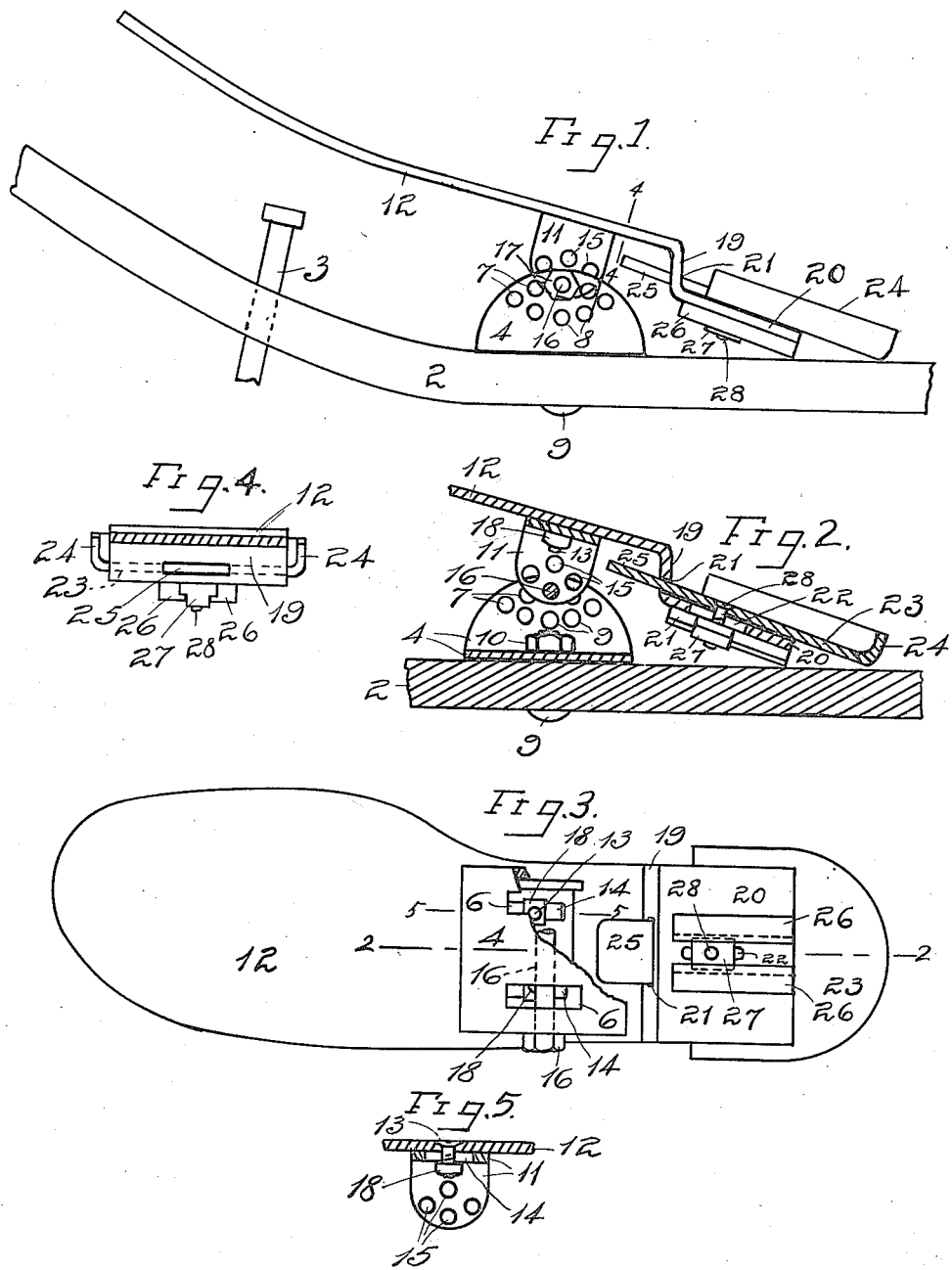

BENJAMIN D. ADAMS, OF GALESBURG, ILLINOIS.

AUTOMOBILE-ACCELERATOR PEDAL.

1,203,955.  Specification of Letters Patent.  Patented Nov. 7, 1916.

Application filed October 13, 1913. Serial No. 794,840.

*To all whom it may concern:*

Be it known that I, BENJAMIN D. ADAMS, a citizen of the United States, and a resident of Galesburg, in the county of Knox and State of Illinois, have invented a new and useful Automobile-Accelerator Pedal.

My invention relates to pedals for automobiles, and particularly to those for actuating the accelerator stem.

In all accelerator-actuating devices which have come under my observation the footpiece connection has been a direct or constant one. This is objectionable, in that one of the driver's feet rests, as a rule, (when the machine is in motion,) upon the accelerator stem or some attachment thereto, and that when an obstruction is struck, or when from any other cause a sudden shock occurs, the involuntary but natural inclination of the driver is to save himself from displacement from his seat, and in doing this he will bear upon said stem and thereby cause the engine to increase its speed and the car to consequently leap forward—and this at the very instant upon which it should be moving slowly. This sudden lurch of the car is not only injurious thereto, but also it frequently causes the occupants to be violently thrown about and seriously injured.

To the end of obviating these objectionable features one object of my invention is to provide a pedal, the arrangement of which with relation to the accelerator stem and the car floor is such that when a sudden shock occurs the driver's foot will not have the tendency above described, but will, on the contrary, be inclined to force the heel of the pedal into contact with the car floor and hold the toe portion thereof out of contact with the accelerator stem.

In connection with the said object a correlated one is to provide a centrally hinged or pivoted foot-pedal which not only may be very quickly operated when required but which provides a secure seat for the foot.

A further object is to provide means whereby a plurality of adjustments may be made, not only for the purpose of adapting it to drivers of various sizes, but also whereby it may be readily adapted to cars varying in structure.

To these ends the principal object of the invention is to generally increase the utility, efficiency and convenience of devices of this character and in a measure to insure safety in the operation of the car.

The invention therefore consists in the novel structural features and in the arrangements and combinations of elements hereinafter described. A preferred embodiment thereof is illustrated in the accompanying drawing, in which the several elements are each designated by a distinguishing reference character, uniformly employed throughout the different views.

In said drawing: Figure 1 is a side elevation; Fig. 2, a longitudinal, central section, partly broken away, taken in the plane of the line 2—2 in Fig. 3; Fig. 3, a bottom plan, partly broken away; Fig. 4, a transverse sectional detail, partly in elevation, taken in the line 4—4 in Fig. 1; and Fig. 5, a longitudinal sectional detail, taken in the line 5—5 in Fig. 3.

2 designates a fragment of an automobile floor provided with an opening for the free passage of an accelerator stem 3, the upper end portion only of which is shown. It will of course be understood that the stem 3 may be of any desired character and connected to any preferred accelerator.

4 designates a substantially U-shaped floor-bracket the base of which is provided with longitudinally arranged slots 6 and the arms of which are provided each with a double series of perforations 7, 8. Bolts 9 pass through the floor 2 and through slots 6 and are engaged each by a nut 10, whereby said bracket may be locked after it has been moved to the desired position by sliding it forward or back on said bolts.

11 indicates an inverted U-shaped pedal-supporting bracket, adapted for selective longitudinal engagements on and with reference to the foot-plate 12 by means of bolts 13 which pass through holes in the base of the former and through longitudinally arranged slots 14 in the latter.

18, 18 designate securing nuts.

Each arm of the bracket 11 is provided with a double series of perforations 15. 16 is a hinge-pin, adapted for engagement with any corresponding pair of said perforations and with any corresponding pair in the series 7, 8.

17 is a securing nut.

At its rear portion the plate 12 is bent downwardly to form an abutment 19 and is thence bent rearwardly to form a shelf 20. 21 indicates a slot in the abutment 19, and 22 a slot in the shelf 20. 23 indicates a heel-plate having a flange 24 and a tongue 25, the latter slidable in the slot 21. 26, 26 designate a pair of guide lugs fixed on the under side of the shelf 20 and in which slides a nut 27 which is engaged by a bolt 28 the head of which seats in a countersink in the plate 23 and the stem of which is slidable with said nut. By these mechanisms the heel-plate may be adjusted longitudinally with reference to the abutment 19. The tongue 25 will prevent the rear portion of the plate 23 from rising or falling movements (especially when the latter is in its rearmost position) when pressure is brought to bear upon it.

The parts supported on and above the hinge-pin constitute the pedal.

It will be evident that the brackets 4 and 11 are adjustable relatively to each other, in order to regulate the height of the pedal; that the bracket 4 is adjustable longitudinally with reference to the accelerator stem; that the brackets 4 and 11 are adjustable longitudinally on each other; that the bracket 11 is adjustable longitudinally with reference to the foot plate; that the heel-plate is adjustable with reference to the abutment 19; and that the flange 24 and said abutment afford means whereby the driver may effectively control the pedal.

The involuntary movement of the driver to retain his position when a shock occurs is almost invariably attended by a stiffening of the muscles and a consequent straightening of the leg. This movement will bring the heel down to depress the plate 23 until it strikes the floor 2, the fore end of the plate being consequently elevated and out of possible contact with the stem 3. The complete attention of the driver is thus diverted from the accelerator and may be directed to governing the other foot and hand levers.

While I have shown and described my improvements in connection with an accelerator stem, it will be understood that they are adapted for use with any foot-pedal actuated device.

It has not been thought necessary or best to encumber this specification and the accompanying drawings with descriptions and illustrations of modifications which are neither essential to nor form any part of the invention. In fact, it will be apparent without such that numerous changes may be made in the details of construction without departing from the spirit and scope of the invention, viewed in its broadest aspect. All this will be indicated in the claim hereof, wherein the omission of reference to the detail features of the elements recited is intended to be a formal declaration of the fact that the omitted elements or features are not essential to the invention covered by that claim.

Therefore, I claim as new:

The combination with an engine control element adapted to be moved by pressure, of a foot pedal mounted to be engaged by the foot of the user and operated to apply pressure to said element, said foot pedal including a mounting longitudinally adjustable with respect to the element, a bracket pivotally connected with the mounting, a foot plate having longitudinally adjustable connection with the bracket and having its forward portion normally overlying the element, and a heel plate adjustably connected to the foot plate beyond the pivotal connection with relation to the element, the mounting of the heel plate together with the latter normally maintaining the pedal in position to space its operative end from the element.

In testimony whereof I hereunto set my hand this 6th day of October, 1913.

BENJAMIN D. ADAMS.

Witnesses:
C. L. OGDEN,
WEBB A. HERLOCKER.